Sept. 22, 1925.
E. F. W. ALEXANDERSON
1,554,698
SURGE PREVENTER
Filed Dec. 22, 1923
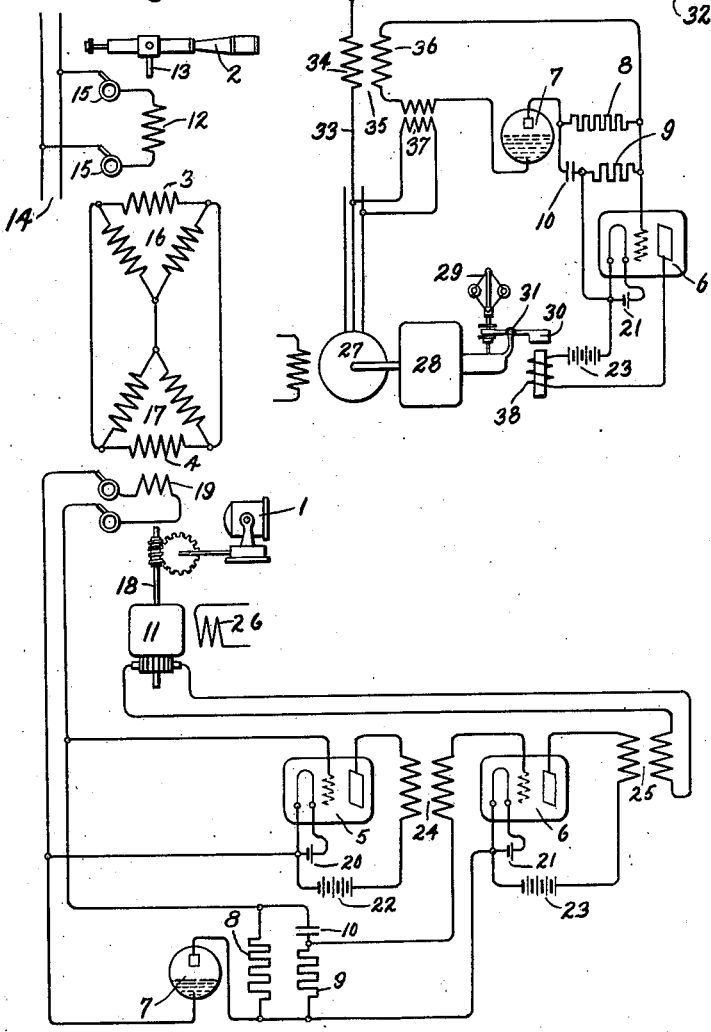
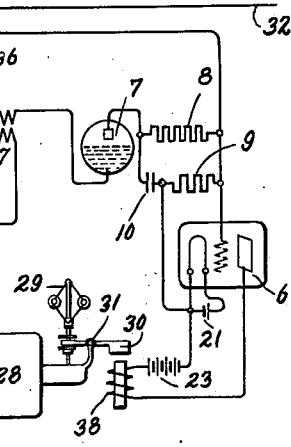
Inventor:
Ernst F. W. Alexanderson,
by
His Attorney.

Patented Sept. 22, 1925.

1,554,698

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SURGE PREVENTER.

Application filed December 22, 1923. Serial No. 682,340.

*To all whom it may concern:*

Be it known that I, ERNST F. W. ALEXANDERSON, a citizen of the United States, residing at Schenectady, in the county of Schenectady, State of New York, have invented certain new and useful Improvements in Surge Preventers, of which the following is a specification.

My invention relates to the synchronous operation of interconnected electric machines, and has for its object the provision of means for preventing voltage or current surges due to variation in the conditions under which the different machines are operated.

In the operation of electric ship propulsion systems comprising a plurality of interconnected alternators driven by Diesel engines, wireless telegraphy systems having two or more high frequency alternators connected to an antenna, gun fire control systems, and many other systems of a similar nature surges are encountered which interfere with the synchronous operation of the interconnected machines. In the case of a gun fire control system for example, there is involved a pilot device and a driving motor which is synchronously controlled by the pilot device. When the pilot device is moved from one position to another the driving motor should follow accurately to the corresponding positions and should stop in a position corresponding exactly with that in which the pilot device is brought to rest. If the control system comprises only a simple synchronous drive acting like the synchronizing force between parallel connected alternators, surges will result. The driving motor will attain kinetic energy which will tend to carry it beyond the point where it should stop. Then the control mechanism will be set in motion and will eventually come up to full speed in the opposite direction and over-shoot in this direction by nearly the same amount. The surges thus produced may gradually die down or they may persist indefinitely.

The remedy which I propose for this difficulty will be readily understood upon consideration of a simple mechanical analogy. Assume one automobile to be towing another by means of a spring the tension of which is proportional to the distance between the two machines. Such a spring has the characteristics of a simple synchronizing force such as that exerted between two alternators. It is quite obvious that, when the first automobile puts on the brakes and comes to rest, the kinetic energy stored up in the trailing machine will cause it to over-shoot the point of zero tension until it is about as much ahead of this point as it was behind it when the first machine started to put on the brakes and that, if the brakes of the trailing machine are not applied, this over-shooting will be followed by a succession of movements in opposite directions until the kinetic energy of the second machine has spent itself in tensing the spring. If the trailing machine has a driver he would put on the brakes as soon as he noticed that the distance between the two machines was decreasing. The same result might be accomplished by an automatic device arranged to apply the brakes of the second machine whenever the tension of the springs started to decrease and to release the brakes when the tension increased. By the use of such an automatic device an automobile may be towed without danger of a collision when the towing machine stops. These are the conditions which must be translated into electrical terms in order to avoid surges between moving masses which are electrically synchronized. The solution of the difficulty is similar in the two cases. In every electrical synchronizing system there is an electrical characteristic, such as current or voltage, which is proportional to the synchronizing force exerted between the different machines and which therefore corresponds to the tension in the spring by which the automobile is towed. In accordance with my invention a change in this voltage or current is utilized to actuate the brakes or their equivalent in the electrical system.

My invention will be better understood when considered in connection with the accompanying drawing and its scope will be pointed out in the appended claims.

Referring now to the drawing, Figure 1 shows the application of my invention to a searchlight remote control system, and Figure 2 illustrates its use in connection with an alternator driven by a Diesel engine.

Fig. 1 shows a searchlight 1 arranged to be moved in synchronism with a telescope 2, the motion of the telescope 2 being reproduced by means of a synchronism indicator comprising inductive devices 3 and 4, a vacuum tube amplifier comprising valves 5 and 6, a surge preventer comprising rectifier 7, resistors 8 and 9 and condenser 10. and a searchlight driving motor 11 which is supplied with current from the vacuum valve amplifier.

The pilot device 3 comprises a rotor winding 12 mounted on the same shaft 13 as the telescope 2 and arranged to be supplied with current from the single phase source 14 through slip rings 15. Upon the stator of the device 3 is wound a polyphase winding 16 which is interconnected with a like winding 17 mounted on the stator member of the receiving device 4, the rotor member of which is mounted on the shaft 18 of the driving motor 11 and is provided with a single phase winding 19. The shaft 18 may be connected with the searchlight through suitable gears.

The inductive devices 3 and 4 are of a type commonly used to reproduce motion at a distance. In the present case, however, these devices are utilized for the purpose of producing an alternating electromotive force, the value of which is substantially proportional to the angular displacement between the telescope and searchlight. With this arrangement single phase current in the winding 12 produces in the device 3 an alternating magnetic field having a position in space which is determined by the position of this winding and, due to the interconnection of the windings 16 and 17, there is produced in the device 4 an alternating magnetic field having a corresponding position in space. The voltage induced in the coil 19 by this field is zero when the coil 19 is at right angles to the field and is a maximum when the field and coil occupy the same position in space. Since the telescope 2 is mounted to rotate with the coil 12 and the searchlight 1 is mounted to rotate with the coil 19, a change in the angular relation existing between the telescope and the searchlight will produce in the coil 19 a voltage the effective value of which is proportional to and the direction of which is dependent upon this change. This voltage is impressed on the power amplifier comprising valves 5 and 6 in such a way as to increase the amplification ratio when the rate of voltage change is increasing and to decrease the amplification ratio when this rate is decreasing.

The valve 5 has its grid circuit connected to the coil 19 and is therefore arranged to amplify the voltage induced in this coil. Connected in parallel with the valve 5 to the coil 19 is the surge preventer which comprises rectifier 7, resistors 8 and 9 and condenser 10 and which is arranged to impress upon the resistor 9 connected across the grid circuit of the valve 6 a voltage which amplifies or decreases the current supplied to the valve 6 from the valve 5 depending on whether the rate of change of the effective value of the voltage induced in the coil 19 is increasing or decreasing. The resistance 8 is preferably of such a value that no considerable current is supplied to the rectifier 7 from the slip rings of the machine 4. The action of the amplifier depends on the slip-ring voltage of the machine 4 and, if a low resistance were used in the circuit of the surge preventer, the machines 3 and 4 would have to get considerably out of correspondence before enough current would be produced to give the required voltage on the amplifier. While I have shown a single rectifier 7 through which every other voltage pulsation is impressed on the grid circuit of the valve 6, it is of course apparent that two rectifiers may be arranged to utilize successive voltage pulsations if desired. The valves 5 and 6 are provided with filament batteries 20 and 21 respectively, with plate batteries 22 and 23, and are connected with each other and to the driving motor 11 through transformers 24 and 25 respectively. The driving motor 11 is provided with a field winding 26 which may be excited from the source 14 and from a separate source in exact synchronism therewith.

As soon as the angular relation between the searchlight 1 and the telescope 2 is changed there is induced in the coil 19 a voltage which is amplified by the valve 5 and power is delivered to the driving motor 11 which starts to move the searchlight into proper angular relation with the telescope. So long as the movement of the telescope is accelerated the rate of change in the voltage induced in the coil 19 is positive and the surge preventer will impress on the grid circuit of the valve 6 a pulsating voltage adapted to increase the ratio of amplification, thereby giving the driving motor an additional driving torque. This motor will therefore soon have attained the same speed as the telescope and will follow it at a constant angular difference. At the same time a charge is being built up on the condenser 10. As soon as the movement of the telescope starts to decelerate, the rate of voltage change becomes negative and the condenser 10 starts to discharge through resistors 8 and 9, thereby reversing the grid potential of the valve 6 and reducing or shutting off the supply of power to the driving motor 11 which is given time to stop simultaneously with the telescope. Should this motor overrun, the voltage induced in the coil 19 is reversed and the process just described is repeated on a somewhat smaller scale.

Fig. 2 shows the application of the surge preventer to a generator 27 driven by a gas engine 28 provided with a governor 29 arranged to control the supply of fuel to the engine 28 and in its operation to move a member 30 pivoted at the point 31. The generator 27 is arranged to supply power to a line 32 through conductors 33 in series with one of which is connected the primary winding 34 of a current transformer 35, preferably of the open core type. To the secondary winding 36 of the transformer 35 is connected the surge preventer previously described. A potential transformer 37 in connected across one phase of the line for the purpose of increasing the sensitiveness of the surge preventer. In series with the plate circuit of the valve 6 to which the surge preventer is connected is the operating coil 38 of an electro-responsive means illustrated as a solenoid arranged to modify the action of the governor 29 in response to change in current supplied by the generator 27. Any increase in the speed of the generator 27 above synchronism with other generators connected to the line 32 will produce a change in the secondary current of the transformer 35 and, while the rate of change is positive, the grid circuit of the tube will have impressed upon it a voltage adapted to increase the current supplied from the valve to the coil 38, thereby retarding the action of the governor and tending to reduce the supply of fuel to the engine. When the rate of change in secondary current of the transformer 35 becomes negative, the condenser 10 will discharge as previously explained and the current supplied to the coil will be decreased, thereby reducing its retarding effect on the governor.

I have explained my invention by illustrating and describing a certain specific embodiment thereof, but it will be readily understood by those skilled in the art that the invention may be embodied in many other forms than that shown and described. I, accordingly, do not wish to be restricted to the particular form, or construction disclosed herein by way of example for the purpose of setting forth my invention in accordance with the patent statutes. The terms of the appended claims are, therefore, not restricted to the precise structure disclosed, but are intended to cover all changes and modifications within the spirit and scope of my invention.

What I claim as new and desire to secure by Letters Patent of the United States is:—

1. A system wherein a synchronizing force is exerted between a plurality of devices arranged to move in synchronism, characterized by the fact that means responsive to change in the rate at which one of said devices departs from synchronism are provided for modifying said synchronizing force.

2. The method of reducing surges in a system wherein a synchronizing force is exerted between a plurality of devices arranged to operate in synchronism which consists in modifying said synchronizing force in accordance with changes in the rate at which one of said devices deviates from synchronism.

3. The method of reducing surges in a system wherein a synchronizing force is exerted between a plurality of devices arranged to operate in synchronism which consists in increasing said synchronizing force upon a positive change in the rate at which one of said devices departs from synchronism, and in decreasing said synchronizing force upon a negative change in the rate at which said device departs from synchronism.

4. The method of maintaining synchronism between a plurality of interconnected electrical machines which consists in increasing the synchronizing force exerted between said machines during the acceleration of one of said machines, and in decreasing said synchronizing force during the deceleration of said machine.

5. A system comprising a plurality of devices arranged to move in synchronism, means for producing a change in electrical characteristics in response to departure of one of said devices from synchronism, and means responsive to the rate of said change in electrical characteristics for bringing said devices into synchronism.

6. An electrical system of the class wherein a synchronizing force is exerted between a plurality of devices arranged to operate in synchronism and wherein a change in the electrical characteristics of said system is produced by departure of one of said devices from synchronism, comprising means responsive to the rate of said change in electrical characteristics for controlling the value of said synchronizing force.

7. A system wherein a plurality of devices are arranged to operate in synchronism and wherein a change in the electrical characteristics of said system is produced by departure of one of said devices from synchronism, comprising means operable in response to said change for restoring synchronism between said devices, means for amplifying said change, and means responsive to the rate of said change for controlling the effect of said amplifying means.

8. An electrical system of the class wherein a plurality of devices are arranged to operate in synchronism and wherein a change in the electrical characteristics of said system is produced by departure of one of said devices from synchronism, comprising means operable in reponse to said change in electrical characteristics for restoring synchronism between said devices, a vacuum valve for amplifying said change in electrical characteristics, and means responsive to the rate of said change in electrical characteristics for controlling the effect of said amplifying means on said restoring means.

9. An electrical system of the class wherein a plurality of devices are arranged to operate in synchronism and wherein a change in the electrical characteristics of said system is produced by departure of one of said devices from synchronism, comprising means operable in response to said change in electrical characteristics for restoring synchronism between said devices, a vacuum valve for amplifying said change in electrical characteristics, and means responsive to the rate of said change in electrical characteristics for amplifying the effect of said amplifying means upon said restoring means when said rate of change is positive and decreasing the effect of said amplifying means upon said restoring means when said rate of change is negative.

10. An electrical system wherein a plurality of devices are arranged to operate in synchronism and wherein a change in the electrical characteristics of said system is produced by the departure of one of said devices from synchronism, comprising means operable in response to said change in electrical characteristics for restoring synchronism between said devices, means for amplifying the effect of said change upon said restoring means, a vacuum valve arranged to control the effect of said amplifying means on said restoring means, and a surge preventer arranged to control the grid polarity of said vacuum valve in accordance with the rate of said change in electrical characteristics.

11. An electrical system wherein a plurality of devices are arranged to operate in synchronism and wherein a change in the electrical characteristics of said system is produced by the departure of one of said devices from synchronism, comprising means operable in response to said change in electrical characteristics for restoring synchronism between said devices, means for amplifying the effect of said change upon said restoring means, a vacuum valve arranged to control the effect of said amplifying means on said restoring means, and a surge preventer comprising a condenser arranged to be charged when said rate of change is positive and to discharge when said rate of change is negative for controlling the grid polarity of said vacuum valve.

12. An electrical system wherein a plurality of devices are arranged to operate in synchronism and wherein a change in the electrical characteristics of said system is produced by the departure of one of said devices from synchronism, comprising electroresponsive means operable in response to said change in electrical characteristics for restoring synchronism between said devices, a vacuum valve for amplifying the effect of said change upon said electroresponsive means, a second vacuum valve arranged to control the effect of said first-mentioned vacuum valve on said electroresponsive means, and a surge preventer including a condenser arranged to be charged when said rate of change is positive and to discharge when said rate of change is negative for controlling the grid potential of said second vacuum valve.

13. An electrical system wherein a plurality of devices are arranged to operate in synchronism and wherein a change in the electrical characteristics of said system is produced by the departure of one of said devices from synchronism, comprising electroresponsive means operable in response to said change in electrical characteristics for restoring synchronism between said devices, a vacuum valve for amplifying the effect of said change upon said electroresponsive means, a second vacuum valve arranged to control the effect of said first-mentioned valve on said electroresponsive means, and a surge preventer for controlling the operation of said second-mentioned vacuum valve, said surge preventer comprising a resistor connected to the grid circuit of said second vacuum tube, and rectifying means and a condenser operatively associated with said resistor.

14. An electrical system wherein a plurality of devices are arranged to operate in synchronism and wherein a change in the electrical characteristics of said system is produced by the departure of one of said devices from synchronism, comprising electroresponsive means operable in response to said change in electrical characteristics for restoring synchronism between said devices, a vacuum valve for amplifying the effect of said change upon said electroresponsive means, a second vacuum valve arranged to control the effect of said first-mentioned valve on said electroresponsive means, and a surge preventer for controlling the operation of said second-mentioned vacuum valve, said surge preventer comprising a resistor connected to the grid circuit of said second vacuum tube, rectifying means and a condenser connected to one of said devices in series with said resistor, and a resistor of comparatively high resistance connected in shunt to said first-mentioned resistor and said condenser.

In witness whereof, I have hereunto set my hand this 21st day of December, 1923.

ERNST F. W. ALEXANDERSON.